US005172588A

United States Patent [19]

Umemoto

[11] Patent Number: 5,172,588

[45] Date of Patent: Dec. 22, 1992

[54] DEVICE FOR DETECTING AN OCCURRENCE OF ABNORMAL CONDITION IN A LOAD

[75] Inventor: Hideki Umemoto, Hyogo, Japan

[73] Assignee: Mitsubishi Denki K.K., Tokyo, Japan

[21] Appl. No.: 640,461

[22] Filed: Jan. 11, 1991

[30] Foreign Application Priority Data

Jan. 12, 1990 [JP] Japan ................ 2-1258[U]

[51] Int. Cl.[5] .................... G01M 19/00

[52] U.S. Cl. .................... 73/119 A; 324/418

[58] Field of Search .................... 73/119 A; 324/418

[56] References Cited

U.S. PATENT DOCUMENTS

| | | | |
|---|---|---|---|
| 3,828,247 | 8/1974 | Kirsch et al. | 73/119 A X |
| 4,649,341 | 3/1987 | Ulbrich et al. | 324/654 X |
| 4,821,562 | 4/1989 | Inoue | 73/119 A |
| 4,875,452 | 10/1989 | Hara et al. | 123/488 |
| 4,932,246 | 6/1990 | Deutsch et al. | 73/119 A |
| 4,941,348 | 7/1990 | Hock | 324/654 X |
| 4,989,150 | 1/1991 | Tazawa | 73/119 A X |

*Primary Examiner*—Jerry W. Myracle

*Attorney, Agent, or Firm*—Sughrue, Mion, Zinn, Macpeak & Seas

[57] ABSTRACT

Disclosed herein is a device for detecting an occurrence of abnormal condition accurately in a load such as a plurality of fuel injectors for use in an internal combustion engine or the like with a single abnormality determining circuit.

10 Claims, 3 Drawing Sheets

DEVICE FOR DETECTING AN OCCURRENCE OF ABNORMAL CONDITION IN A LOAD

BACKGROUND OF THE INVENTION

This invention relates to a device for detecting an occurrence of abnormal condition in a load such as a fuel injector for use in an internal combustion engine or the like (hereinafter referred to merely as "a load abnormality detecting device", when applicable).

A conventional load abnormality detecting device will be described with reference to FIG. 1 showing a circuit diagram thereof.

The conventional load abnormality detecting device, as shown in FIG. 1, comprises: a transistor 2 the base of which is connected to a drive unit 1 with an emitter grounded; a load, namely, a fuel injector 3 connected to the collector of the transistor 2; and an abnormality determining circuit 4. The injector 3 is also connected to a 12 V battery.

The operation of the conventional load abnormality detecting device thus organized will be described with reference to FIG. 2 which is a waveform diagram showing a voltage applied to the fuel injector 3.

The battery voltage is applied to the fuel injector 3 through the transistor 2 which is rendered conductive (on) or non-conductive (off) by the drive unit 1. More specifically, as shown in FIG. 2, when the transistor 2 is rendered conductive (on), the 12 V battery voltage is applied to the fuel injector 3, and when the transistor 2 is rendered non-conductive (off) 0 V is applied to the fuel injector 3. That is, a large surge voltage is applied to the fuel injector 3 when the transistor is rendered non-conductive (off).

The abnormality determining circuit 4 determines that the fuel injector 3 is out of order, when no such a surge voltage is applied to the fuel injector 3.

That is, the abnormality is detected from the output waveform of the injector. Hence, it is necessary to provide as many abnormality determining circuits as injectors employed.

As was described above, with the conventional load abnormality detecting device, the abnormality is detected from the output waveform of the injector. Therefore, the conventional load abnormality detecting device suffers from a difficulty that it is necessary to provide one abnormality determining circuit for each of the injectors.

Furthermore, disadvantageously it is difficult for the device to detect the abnormal condition of the fuel injector with high accuracy.

SUMMARY OF THE INVENTION

In view of the foregoing, an object of this invention is to provide a load abnormality detecting device which can accurately detect abnormal conditions which may occur in a plurality of loads such an a fuel injectors provided to an internal combustion engine with only one abnormality determining circuit.

According to the present invention, the above and other objects of the present invention is met to the provision of a load abnormality detecting device comprises a switching circuit connected to a load, for performing the on-off control of a current flowing through the load and an abnormality determining circuit for determining whether the load is normal or not according to the value of current flowing through the switching circuit. In this case, the load may be replaced by a parallel circuit comprises a plurality of loads such as fuel injectors connection in parallel with each other.

DESCRIPTION OF THE PREFERRED EMBODIMENTS

A first embodiment of the invention, a load abnormality detecting device will be described with reference to FIG. 3.

Figure 1:
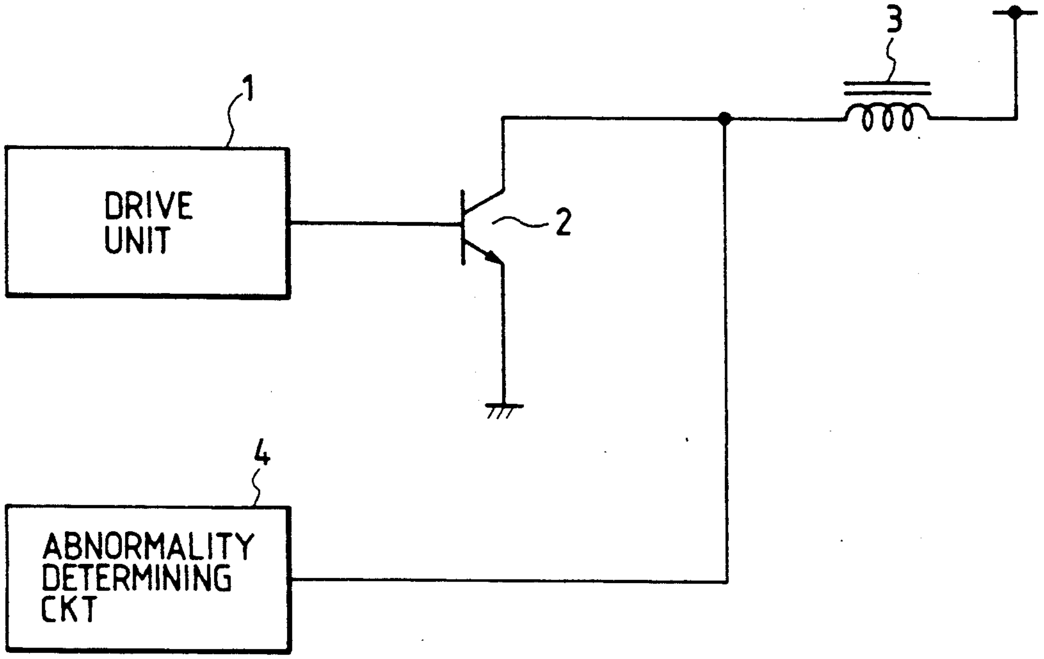
FIG. 1 PRIOR ART
FIG. 1 is a circuit diagram showing a conventional device for detecting an occurrence of abnormal condition in a load.
Figure 2:
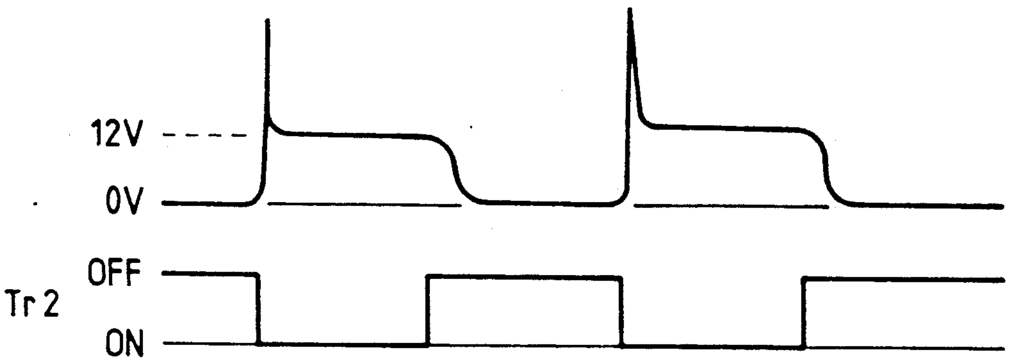
FIG. 2 is a waveform diagram for a description of the operation of the apparatus.
Figure 3:
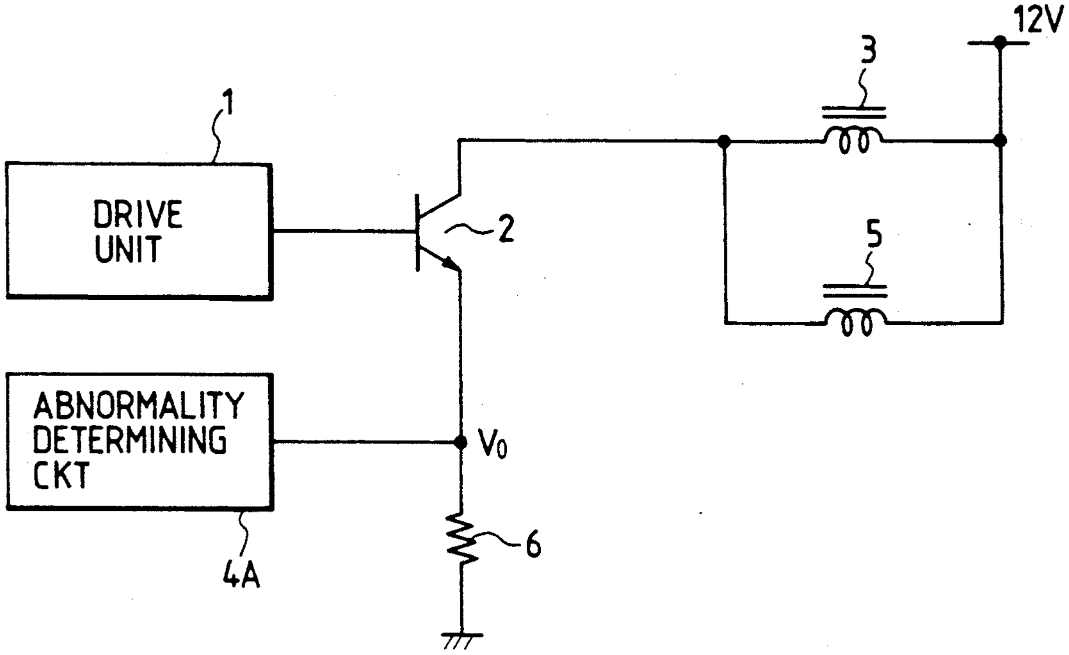
FIG. 3 is a circuit diagram showing a first embodiment of a device for detecting an occurrence of abnormal conditions in a load according to the present invention.

The load abnormality detecting device, as shown in FIG. 3, comprises a drive unit 1, a transistor 2 and a fuel injector 3 which are the same as or equivalent to those in the conventional load abnormality detecting device described above.

More specifically, the load abnormality detecting device of the invention further comprises an abnormality determining circuit 4A including a microcomputer connected to the emitter of the transistor 2, a fuel injector 5 connected in parallel to the fuel injector 3 and a resistor 6 one terminal of which is connected to the emitter of the transistor 2 with the other terminal grounded.

In the first embodiment, the transistor 2 functions as a switching circuit.

The operation of the first embodiment thus organized will be described with reference to FIGS. 4 and 5.

Figure 4:
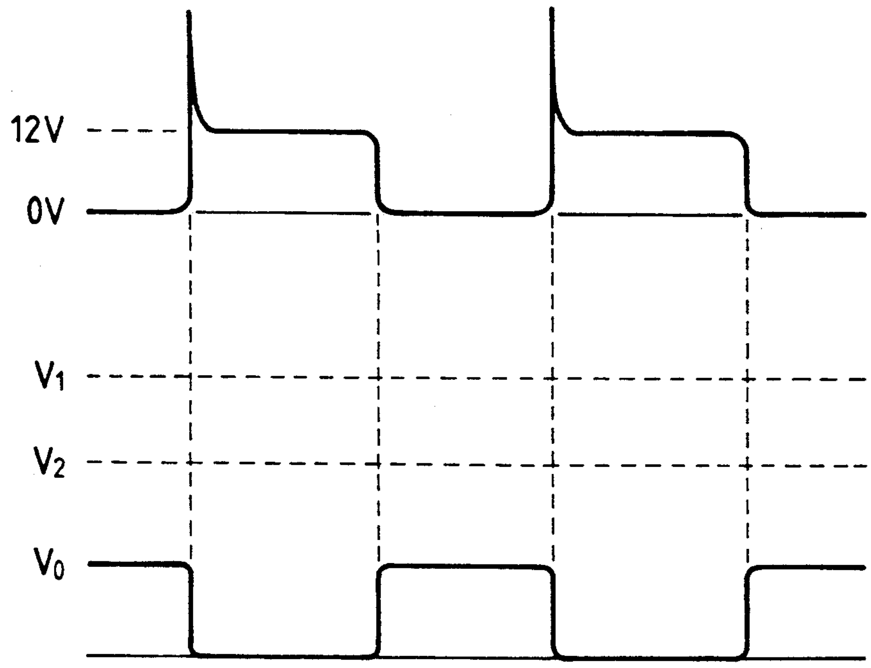
FIG. 4 is a waveform diagram showing operating signals in the abnormality detecting device shown in FIG. 3.
Figure 5:
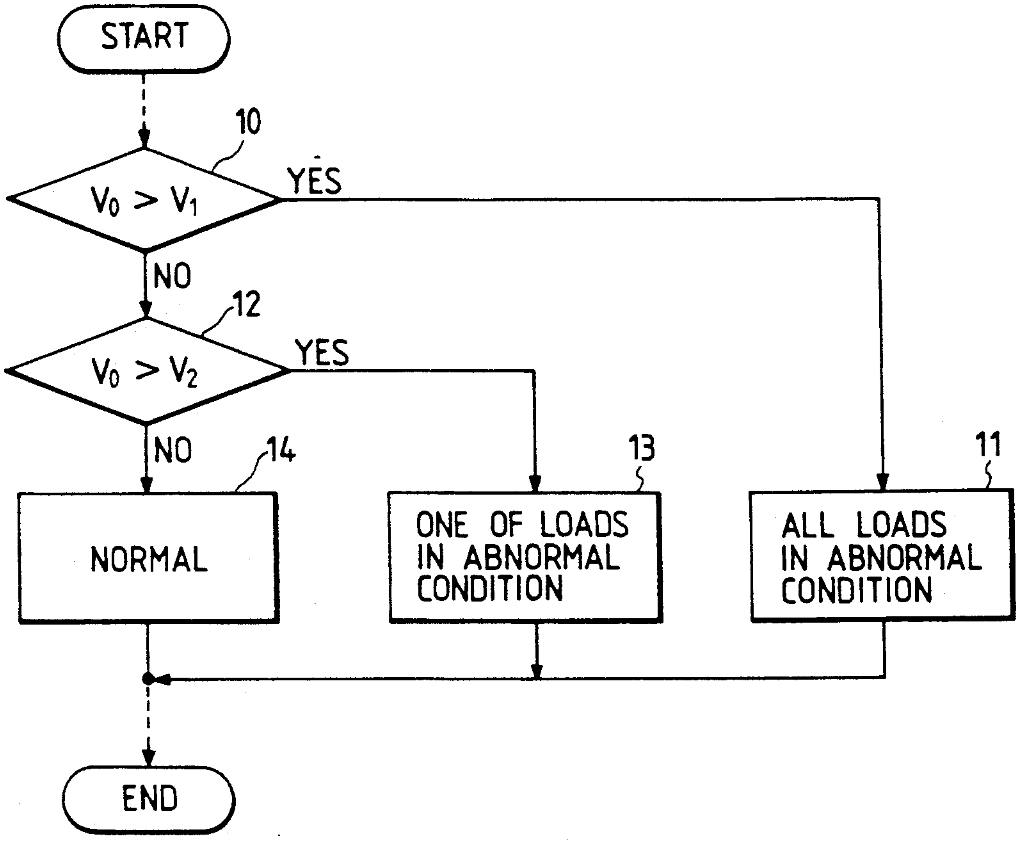
FIG. 5 is a flow chart for a description of the operation of the first embodiment.

FIG. 4 is a waveform diagram showing operating signals in the first embodiment, and FIG. 5 is a flow chart for a description of the operation of the first embodiment.

In the first embodiment, the currents flowing in the injectors 3 and 5 are detected to determine whether or not the fuel injectors 3 and 5 are normal. When each injector is cut off, the current is zero; and when each injector 2 is shorted out, a large current will flow.

In Step 10 of the flowchart shown in FIG. 5, the abnormality determining circuit 4A compares a voltage $V_0$ appearing across the resistor 6 due to the currents flowing through the injectors 3 and 5 with a reference voltage $V_1$ as shown in FIG. 4.

When $V_0 > V_1$, then Step 11 is effected. When $V_0 \leqq V_1$, then Step 12 is effected.

In Step 11, it is determined that both of the injectors 3 and 5 are abnormal, and the abnormality thus determined is displayed on a display unit (not shown).

In Step 12, the voltage $V_0$ developed across the resistor 6 is compared with another reference voltage $V_2$.

When $V_0 > V_2$, then Step 13 is effected. When $V_0 \leqq V_2$, then Step 14 is effected.

In Step 13, it is determined that either the injector 3 or 5 is out of order, and the result of determination is displayed on the display unit (not shown).

In Step 14, it is determined that both the injectors 3 and 5 are normal because $V_0 \leqq V_2$.

As described above, one abnormal determining circuit 4A detects the plural currents flowing through a plurality of injectors to determine whether these injectors are normal or not.

Figure 6:
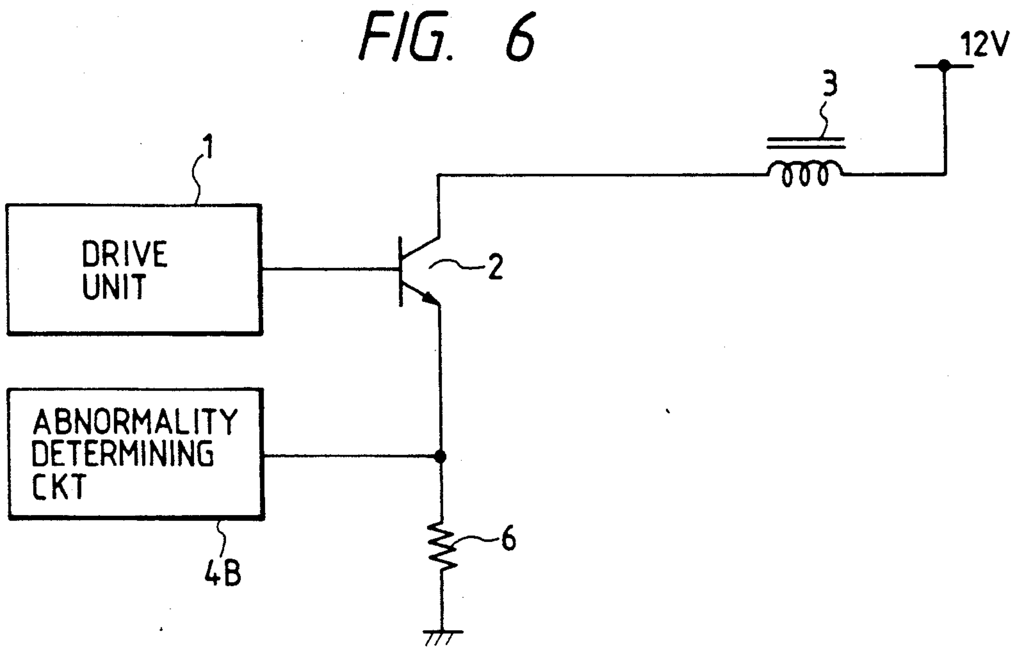
FIG. 6 is a circuit diagram showing a second embodiment of the present invention.

Now, the arrangement of the first embodiment of the present invention may be modified to employ a single fuel injector as shown in FIG. 6.

More specifically, the second embodiment comprises: the above-described drive unit 1, transistor 2 and a resistor 6, a single fuel injector 3 and an abnormality determining circuit 4B connected to the emitter of the transistor 2.

The abnormality determining circuit 4B detects the value of the current (other than the surge portion thereof) flowing in the fuel injector 3, to determine whether or not the fuel injector 3 is out of order.

When the fuel injector 3 is cut off, the current is zero; and when it is shorted out, large current will flow therethrough.

In the second embodiment, the abnormality determining circuit 4B detects a voltage developed across the resistor based upon the current flowing in the fuel injector, thereby to stably detect whether the injector is normal or not.

In the first embodiment, only two parallel fuel injectors are employed; however, modifications are possible without departing from the technical concept of the present invention by employing more than two injectors.

While the preferred embodiments have been described with reference to the fuel injector, it goes without saying that the technical concept of the invention may be applicable to other loads for use in a motor vehicle.

As was described above, with the load abnormality detecting device according to the present invention, one abnormality determining circuit can detect whether a plurality of loads are normal or abnormal according to the value of the current flowing through the switching element. Hence, it can be detected stably whether the fuel injector is normal or abnormal.

What is claimed is:

1. A load abnormality detecting device comprising:
a switching circuit connected between one or more loads and a resistor, for performing the on-off control of a current flowing through said one or more loads; and
an abnormality determining circuit for determining whether said one or more loads are normal or not according to the value of a current flowing through said switching circuit, by measuring a voltage across said resistor and comparing said measured voltage to first and second reference voltages.

2. A load abnormality detecting device as claimed in claim 1, wherein said measured voltage corresponds to a portion of said current flow other than a surge portion thereof.

3. A load abnormality detecting device as claimed in claim 2 wherein said load comprises a single load connecting in series with said switching circuit.

4. A load abnormality detecting device as claimed in claim 3 wherein said single load comprises a single fuel injector for use in an internal combustion engine.

5. A load abnormality detecting device as claimed in claim 2 wherein said load comprises a plurality of loads connected in parallel with each other, which is coupled in series with said switching circuit.

6. A load abnormality detecting device as claimed in claim 5 wherein said single load comprises a plurality of fuel injectors for use in an internal combustion engine.

7. A load abnormality detecting device as claimed in claim 5, wherein said abnormality determining circuit determines that an abnormality exists in every one of said plurality of loads when said measured voltage is greater than said first reference voltage and that an abnormality exists in only one of said plurality of loads when said measured voltage is between said first and second reference voltages, said second reference voltage being less than said first reference voltage.

8. A load abnormality detecting device as claimed in claim 1, wherein said abnormality determining circuit simultaneously determines whether all of said loads are normal or not, by measuring a single voltage across said resistor corresponding to a total amount of current drawn by all of said loads.

9. A load abnormality detecting device comprising a switching circuit connected between multiple loads and a resistor, for performing the on-off control of a current flowing through said loads; and
an abnormality determining circuit for simultaneously determining whether all of the loads are normal or not according to the value of a current flowing through said switching circuit, by measuring a single voltage across said resistor and comparing said measured voltage to first and second reference voltages, wherein said measured voltage corresponds to a portion of said current flow other than a surge portion thereof, said current flow representing a total amount of current drawn by all of said loads.

10. A load abnormality detecting device as claimed in claim 9, wherein said abnormality determining circuit determiners that an abnormality exists in every one of said loads when said measured voltage is greater than said first reference voltage and that an abnormality exists in only one of said loads when said measured voltage is between said first and second reference voltages, said second reference voltage being less than said first reference voltage.

* * * * *